United States Patent Office 3,369,884
Patented Feb. 20, 1968

3,369,884
FERTILIZER TABLET THAT READILY DISINTE-
GRATES WHEN WATER IS ADDED
Hollis M. Barron, Los Gatos, Calif., assignor to Agriform-
International Chemicals, Inc., Newark, Calif., a cor-
poration of California
No Drawing. Continuation-in-part of application Ser. No.
600,368, Dec. 9, 1966, which is a division of application
Ser. No. 324,874, Nov. 19, 1963. This application
June 29, 1967, Ser. No. 649,842
6 Claims. (Cl. 71—28)

ABSTRACT OF THE DISCLOSURE

A tablet that breaks up quickly when initially watered to make slowly-soluble fertilizer available for bacterial action and the action of repeated waterings. Expanded vermiculite acts as a disintegrant and also provides for lubricating the tablet during manufacture.

---

This application is a continuation-in-part of application Ser. No. 600,368, filed Dec. 9, 1966, now abandoned which was a division of application Ser. No. 324,874, filed Nov. 19, 1963, now abandoned.

This invention relates to tablet-type plan fertilizer.

Many plants are now grown and held for sale in containers; nurserymen grow millions of plants in pots, gallon cans, and five-gallon cans. Usually care is taken to grow the plants in a sterile and disease-free soil mixture. For example, the so-called "UC Mixes," which are recommended by the University of California for nursery production, contain no earth but are made up entirely of sand, or peat moss, or peat moss and sand; in alternative forms, redwood shavings, sawdust, or rice hulls are used in place of some or all of the peat moss. None of these ingredients contains an appreciable amount of food for the plant; so the nurserymen must feed the plants, or they will die. Heretofore, feeding has been done either by incorporating a chemical fertilizer into the soil mix, by watering the plants periodically with liquid fertilizers, or by periodically applying measured amounts of granular fertilizers. Usually the nutrient value of the fertilizer has been used up quickly, and there have had to be very frequent applications of fertilizer. Moreover, a large proportion of the applied fertilizer nutrients were lost by the leaching effects of watering.

When wholesale nurserymen deliver a large number of plants to a nursery, it is desirable for each plant to have its container supplied with enough fertilizer to feed the plant for several months, preferably at least until the plant is actually sold, because many retail nurserymen neglect the feeding of the plants. A still further reason why it is desirable for the container to be supplied with enough plant food to last several months is that many people who buy plants do not at once put them into the ground and do not fertilize them either; consequently, it is desirable for the wholesale and retail nurserymen to deliver the plants with their containers already supplied with an amount and type of food that will feed them for many months. Then all that the retailer or purchaser has to do is to water the plants. An object of this invention is to provide a fertilizer tablet that will help in accomplishing these desirable purposes.

Tableted fertilizers have long been used, but heretofore, they have not been able to accomplish the purposes for which the present invention is used. Some tablets have contained rapidly soluble fertilizers, which are soon consumed by the plant or are leached out. In contrast, Patent No. 3,024,098 shows very slowly soluble, non-distintegrating tablets for use when transplanting trees into the ground; these tablets last a very long time, up to two years, and require no distribution or dispersal because the trees are planted in soil and the tablets are held in their location by the soil. However, these tablets are not suitable for nursery container use, because they do not make enough food available at the beginning, nor do they make it available at a fast enough rate for container-grown plants, due to the tablets remaining hard and unbroken for a long time and thereby not exposing very much surface area to bacterial activity and to solubilization by soil moisture. Without bacterial activity, some of the main ingredients are practically insoluble, and it takes a long time for the bacteria to work on such unbroken tablets.

An object of the present invention is to provide a tableted plant food or fertilizer containing, in slowly available form, the major ingredients and some of the trace elements necessary for sustenance of the plant for approximately four to six months.

Another object is to provide a tablet which is readily, almost instantaneously, broken up by water so as to expose a large surface area of the slowly available fertilizer, thereby making the fertilizer available from the beginning and to provide for conversion at a proper rate of its ingredients from an unavailable form to an available form.

Chemical fertilizers tend to create a salinity problem, in which the soil contains salts in excess and stunt or kill the plant, instead of feeding it. Some plants are more sensitive than others, and for general use, the very sensitive plants must be considered. Another object of this invention is to provide a tablet with a low salinity index, so that plant injury from soluble salts is minimized.

Most tablets that are made from largely water-insoluble components are hard and intractable. It has not been easy to provide a tablet which breaks up completely and instantaneously without using fertilizer ingredients that are quite soluble in water. I soon found that it was necessary to include, in addition to the fertilizer ingredients, a disintegration - and - dispersal - promoting ingredient. Even then, I found that tablets made from some mixtures will break up readily when fresh but will not break up after having been strode for several months, the absorption of moisture from the air apparently causing them to harden and become almost inpervious to water.

For example, I have made fertilizer tablets from slowly soluble fertilizer materials, using ordinary various starches, including corn starch, as a disintegrant, but I found that the disintegration rate was not rapid enough for complete dispersal of the tablet during the time water from the first irrigation was present. Then, after being once wetted and then dried, the undispersed remainder of the tablet tended to form a hard cake, apparently due to cementing effects of the once-wetted starch. The cementing effects made the tablet resist disintegration at subsequent irrigations, and the release rate of plant nutrients from the chemicals was found to be too slow to sustain healthy plant growth. Some specialized types of starch produced a fairly good disintegration rate, but the tablets still did not disperse over a wide surface of the soil, because the individual particles tended to cling together in one location—an undesirable characteristic. Dispersal is important to provide steady and correct nutrition.

I have also tried water-soluble gums as disintegrants for tablets of slowly-soluble fertilizers; the tablets had moderately good disintegration rates, but only fair dispersal characteristics.

The present invention provides a long-lasting slowly-soluble fertilizer tableted with the aid of a readily water-soluble binder, which dissolves very readily when water is applied, so that the tablet breaks up. In fact, the tablet will break up within one minute of the application of water and usually quicker. A nurseryman simply throws one or more tablets into each container and then waters the plants. The tablet immediately breaks up, so that fertilizer immediately begins to act on the entire plant, but, being slowly available, continues to feed the plant for months. Then the treatment is repeated.

In tableting most mixtures of materials, including the fertilizer materials involved here, it is necessary to include in the formula a lubricating ingredient to continually protect from abrasive wear the metal surfaces of the tableting equipment that come in contact with the materials being tableted, to facilitate the compression of the tablets, and to enable proper extraction of the tablets from the dies in which the tablets are formed. Almost all chemicals commonly used as tablet lubricants were found unsatisfactory for use in the present invention, because they tended to waterproof the tablet, minimizing the rate of water entry into it and thereby preventing or delaying disintegration of the tablet. Hence, another object of the invention is to provide a fertilizer tablet containing a lubricant that not only provides satisfactory lubrication, but does so without significantly reducing the rates of water penetration and tablet disintegration.

Other objects and advantages will appear from the following description of some preferred embodiments of the invention.

The invention provides a tablet having, in combination, fertilizing agents, a lubricant which enables the proper pelleting to size while not substantially restricting the entry of water into the tablet, and a disintegrant agent which does not prevent the tablet from holding together until it is wet and then, when wet, enables the tablet to fall apart rapidly, although up to the time when the water is applied, the tablet is very stable indeed.

Expanded vermiculite, when used in adequate amounts (25 to 50% by weight of formula), produces tablets with very rapid disintegration rates and excellent dispersal characteristics. No additional lubricant is needed, though talc may be used, if desired, at rates of 2% to 10% of the tablet. The tablets are moderately soft, and so are subject to attrition wear during handling and shipping. Special tablet making equipment is needed to efficiently produce tablets containing adequate quantities of vermiculite, due to the poor flow characteristics of these mixtures and to a tendency for the vermiculite particles to segregate from the mixture. Also, the bulk density of such mixtures is too low for the compression ratios of most tableting equipment available.

A binder is ordinarily used in order to provide a tablet that can be handled and shipped rather roughly when dry without breaking up. Vermiculite tablets of this type without a binder tend to require rather delicate treatment. The binder need not be water-soluble, but it should be non-waterproofing. Any dry non-waterproofing tableting binder that does not react chemically with the other ingredients of the tablet may be used, so long as it does not interfere with the water penetration and disintegration of the tablet. An adequate amount should be used to provide the binding function properly, typically about 1% to 7% of the tablet, by weight. The binder preferably should not require wetting in order to perform its job, for the ingredients are preferably mixed and tableted dry.

The fertilizer tablets of this invention disintegrate physically and disperse over the soil surface upon the first application of irrigation water. Dispersal enables maximum solution of the soluble plant food content during the first irrigation and enables immediate washing of this nutrient portion down into the plant root zone where the plant can rapidly take in adequate nutriment. Furthermore, rapid disintegration and dispersal provides intimate contact between the soil and the insoluble and unleachable chemicals, so that the soil bacterial action commences and gradually changes the insoluble and unleachable chemicals into forms that are soluble and are available for use by the plant. Some water-soluble fertilizer can form a minor amount of the tablet, to give an initial boost to the plants.

*Example 1*

A satisfactory tablet can be made as follows:

| Ingredient | Percent by weight |
|---|---|
| Urea formaldehyde, 38% N | 23.7 |
| Calcium phosphate, 45% $P_2O_5$ | 4.5 |
| Fritted potash | 20.7 |
| Gypsum | 15.6 |
| Iron sulfate | 0.5 |
| Expanded vermiculite, #4 grade | 30.0 |
| Sodium lignin sulfonate (a water-soluble binder) | 5.0 |
| Total | 100.0 |

This gives a 9–2–3 fertilizer plus 3% of slowly soluble $K_2O$ and 4% calcium. It disintegrates rapidly and satisfactorily, though bulky.

For two-inch to four-inch pots a 1-gram tablet is useful; for four-inch to eight-inch pots 6-gram tablets are useful; and for six-inch pots up to five-gallon cans 12-gram tablets are useful, and so on.

The above formula is a scientifically balanced low-toxicity plant food with long-lasting characteristics which meets the problems of nutrition encountered by the nursery stock grower, the retail nurseryman, and also by the final purchaser of plant materials when they are to be grown in containers. The whosesale grower adds a sufficient number of tablets to the stock just prior to shipment to insure continued balanced feeding for a period of about four to six months from the date of shipment, and then waters them. The tablets may be also used as a substitute for liquid feeding during wet weather periods, when liquid feeding becomes impractical. A retail nurseryman may add the tablets to container stock not treated by the wholesaler, or if he holds the stock more than four to six months, he should add them. The home gardner may also add them once every four to six months to the pots, boxes, or tubs, always watering immediately following application.

In use, the proper number of tablets is placed on the surface of the planting medium, whether it be soil, UC mix, or whatever. They are not pressed in but are simply placed on top and watered. Thus, for two-inch and three-inch pots, one or two 1-gram tablets will suffice, for four-inch pots three to five 1-gram tablets or one 6-gram tablet will be used. For a six-inch pot one or two 6-gram tablets or one 12-gram tablet will be used. For eight-inch pots and one-gallon containers, two to four 6-gram tablets or one or two 12-gram tablets are used. For three-gallon containers, three or four 12-gram tablets are used, and for five-gallon containers four or five of the 12-gram tablets are used.

When the tablets, made as stated above, are placed on top of the planting medium and are watered, they immediately melt down, within less than one minute, and begin to disperse around and through the top area of the container. The soluble portion immediately becomes available to the plants. However, most of the ingredients are water insoluble, and therefore most of the plant food value is retained until these ingredients are acted upon by bacteria and moisture that are present in the planting medium and by repeated waterings. Therefore, leaching loss of nutrients is held to a minimum while the material is still distributed. Of course, the proper number of tablets depends upon the plant species, the level of nutrition required, the type of container, and so on.

As the soil mixtures used in most containers for growing nursery plants are rather porus in nature, free water is present on the soil surface for a limited time, for 30 seconds or less. Therefore, a good rate of disintegration and dispersement was considered as 30 seconds or less.

A moderate rate was considered as 30 to 60 seconds, and over 60 seconds was considered poor.

Sodium lignin sulfonate, the binder stated in Example 1, may be replaced by powdered sucrose, lactose, water soluble gums such as gum arabic, water soluble or miscible animal glues such as protein colloids of collagen source, or other suitable binders.

*Example 2*

| Ingredient: | Percent by weight |
|---|---|
| Urea formaldehyde, 38% N | 68.5 |
| Ferrous sulfate | 1.0 |
| Expanded vermiculite, #4 grade | 25.0 |
| Powdered sucrose (or other non-waterproofing binder) | 5.5 |

This formula gives a 26-0-0 fertilizer plus 0.2% iron. It is useful in providing supplemental nitrogen and iron in situations where adequate phosphate and potash have already been supplied, as by previous use of tablets according to Example 1, or by liquid fertilizer feed systems, or by incorporation of such plant foods in the planting medium.

The vermiculite again would serve as both a disintegrant and lubricant, while powdered sucrose is exemplary of non-waterproofing binders enabling production of a readily disintegrating tablet that is sufficiently hard before wetting to be handled and shipped with minimum breakage.

Generally speaking, the larger the size of the tablet, the greater the proportion of vermiculite that should be used in order to obtain a given rate of tablet disintegration when the water is applied to the tablet. A six-gram tablet made according to Example 2 is quite satisfactory. For use in twelve-gram tablets, the vermiculite proportion should be 35%, with a corresponding decrease in the urea formaldehyde proportion to 63.8%.

I claim:
1. A fertilizer tablet weighing at least one-half gram, for slowly feeding a plant over a period of several months, comprising,
   a tableted intimate mixture of solid particles of the following dry ingredients:
   a fertilizer composition that is very slowly water soluble and is to a large extent capable of being broken down into water-soluble substances by the continued action of soil bacteria, said fertilizer composition constituting the major ingredient of said tablet,
   expanded vermiculite in the amount of about 25% to about 50% by weight of the tablet as a tablet disintegrant and a tableting lubricant which does not interfere with water penetration and disintegration of the tablet, and
   a non-waterproofing tableting binder which does not interfere with the water penetration and disintegration of the tablet, in adequate amount to perform its binding function,
   whereby said tablet on contact with a sprinkling or irrigation of water disintegrates in a time of the order of one minute to render its major ingredient accessible to the actions of subsequent water and of soil bacteria.

2. The tablet of claim 1 including as a minor ingredient a water-soluble fertilizer composition which provides an initial boost to the plant, succeeded by the long-term feeding from the said major ingredient of the tablet.

3. The tablet of claim 1 having said binder readily water soluble.

4. The tablet of claim 1 wherein the fertilizer composition consists essentially of urea formaldehyde, calcium phosphate and fritted potash.

5. A fertilizer tablet weighing at least one-half gram, for slowly feeding a plant over a period of several months, comprising
   a tableted intimate mixture of solid particles of the following ingredients:
   a mixture of urea-formaldehyde, calcium phosphate, and fritted potash as a fertilizer composition constituting the major ingredient of said tablet,
   expanded vermiculite in the amount of about 25% to 50% by weight of the tablet as a tablet disintegrant, and
   sodium lignine sulfonate in the amount of about 5% by weight of the tablet as a binder,
   whereby said tablet on contact with a sprinkling or irigation of water disintegrates in a time of the order of one minute to render its major ingredient accessible to the actions of subsequent water and of soil bacteria.

6. The tablet of claim 5 including as a minor ingredient a water-soluble fertilizer composition which provides an initial boost to the plant, succeeded by the long-term feeding from the said major ingredient of the tablet.

References Cited

UNITED STATES PATENTS

| 3,214,261 | 10/1965 | Galloway | 71—64 X |
| 2,341,800 | 2/1944 | Martain | 71—64 X |
| 3,024,098 | 3/1962 | Austin et al. | 71—64 |
| 1,513,298 | 10/1924 | Turrentine | 260—209.6 X |

DONALL H. SYLVESTER, *Primary Examiner.*

R. BAJEFSKY, *Assistant Examiner.*